May 28, 1968     H. W. CARLSEN     3,385,635
APPARATUS FOR UNLOADING PULVERULENT BULK CARGO FROM SHIPS
Filed Jan. 21, 1963     4 Sheets-Sheet 2

Inventor
Helmuth W. Carlsen
By
Wenderoth, Lind & Ponack
Attorneys

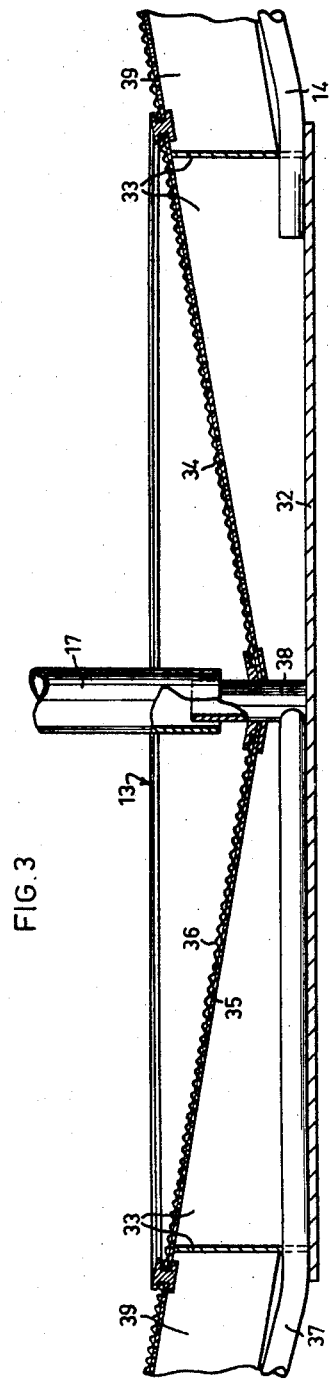

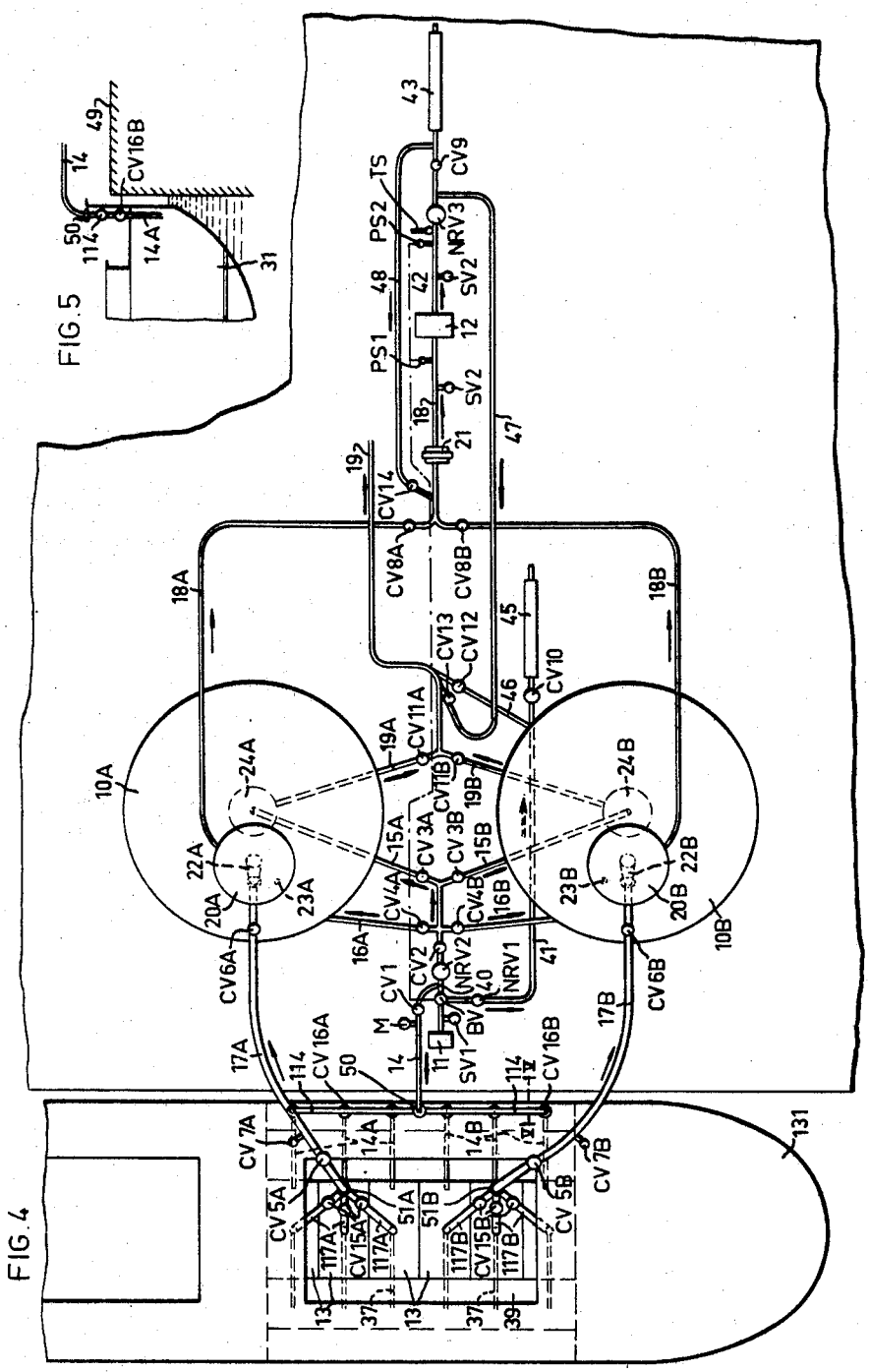

United States Patent Office 3,385,635
Patented May 28, 1968

3,385,635
APPARATUS FOR UNLOADING PULVERULENT
BULK CARGO FROM SHIPS
Helmuth William Carlsen, Malmo, Sweden, assignor to Aktiebolaget Interconsult, Malmo, Sweden, a corporation of Sweden
Filed Jan. 21, 1963, Ser. No. 252,859
4 Claims. (Cl. 302—53)

This invention relates to the handling of pulverulent material, particularly the unloading of such material ships in which the material is transported as bulk cargo.

The invention is based on the well-known fact that powder, e.g. cement, can be caused to flow as a liquid and be conveyed through pipelines if it is aerated, that is air is blown into the powder so that the particles become suspended in the air.

The main object of the invention is to provide an apparatus for such pneumatic unloading of pulverulent bulk cargo from ships by using both pressure and vacuum for producing an air suspension of the powder in the cargo compartments of the ship, sucking up the suspension from the compartment to a separator and separating the powder and the air in the separator under vacuum, and then again suspending the powder in air and blowing the suspension under pressure to some kind of receiving station on shore.

Other, more specific objects of the invention and the advantages thereof will become apparent from the following detailed description, reference being had to the accompanying drawings, in which:

FIG. 3 is a vertical sectional view on a larger scale of an aerator and suction device shown in FIG. 1 placed on the bottom of a ship during unloading;

FIG. 4 is a schematic plan view on the same scale as in FIG. 1 of a modification of the apparatus in FIG. 1 having two separator tanks;

FIG. 5 is a partial vertical sectional view taken on line V—V in FIG. 4.

Figure 1:
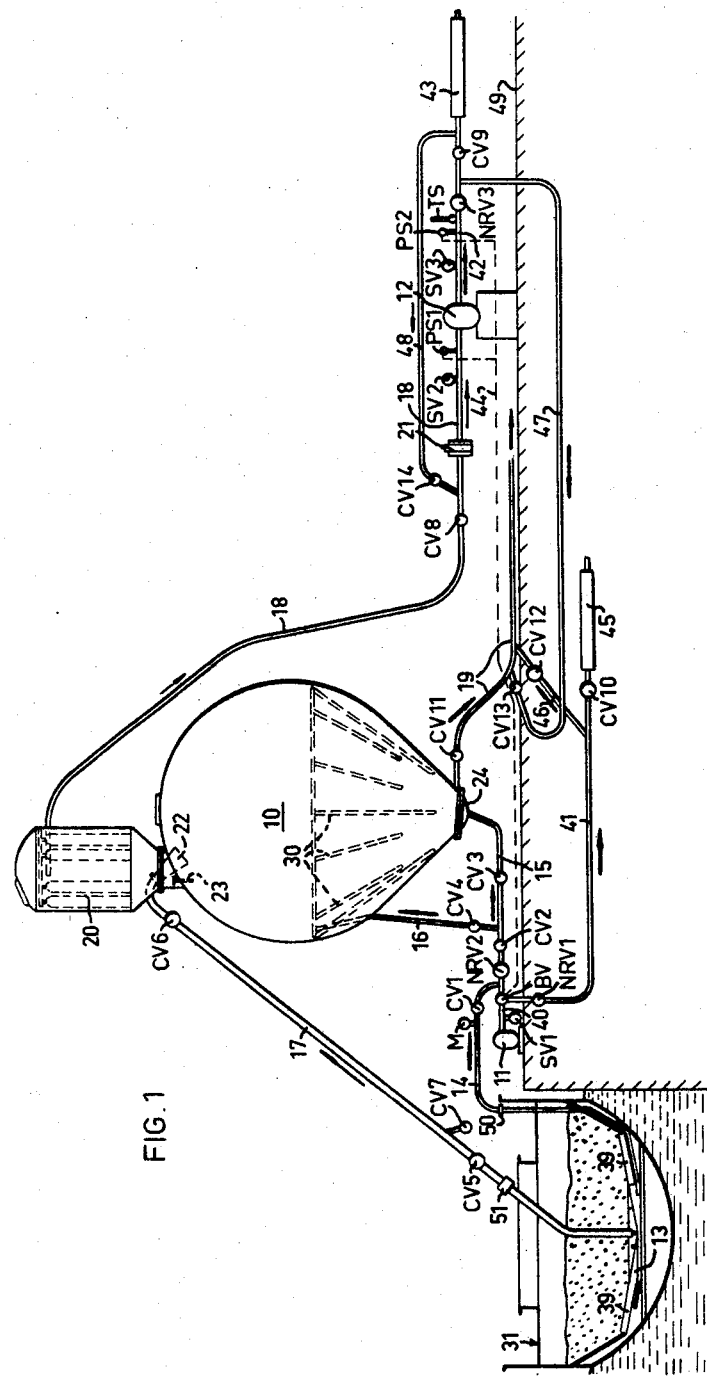
FIG. 1 is a schematic elevational view of an unloading apparatus according to the invention having one separator tank.

The main components of the apparatus shown in FIG. 1 are: a separator tank 10, a first air pump 11 operating as a pressure pump, a second air pump 12 operating mainly as a suction pump, an aerator 13 placed on the bottom of a cargo compartment to suspend the material therein in air, a first pressure conduit 14 passing compressed air from pump 11 to aerator 13, a second pressure conduit 15 passing compressed air from pump 11 to tank 10 for suspending material therein, a third pressure conduit 16 passing compressed air from pump 11 to tank 10 for suspending material therein and blowing the suspension out of said tank, a first suction conduit 17 for sucking suspension from aerator 13 to tank 10, a second suction conduit 18 for sucking air from tank 10 to pump 12 and a fourth pressure conduit 19 for blowing suspension from tank 10 to a receiving station on shore. In FIG. 1, the pressure conduits are indicated by thick arrows, and the suction conduits by thin arrows.

To this comes a filter unit 20 through which the suction conduit 18 sucks air from tank 10, a second filter unit 21 in suction conduit 18 and sundry valves and other control means as well as further conduits for more specific purposes.

This apparatus operates batch-wise, inasmuch as during a first operating period with vacuum in tank 10 it sucks a batch of suspended material into tank 10 and there separates the material from the suspension air, and in a second operating period with pressure above atmospheric in the tank again suspends the material in the tank and blows the suspension out of the tank into for example a silo.

Tank 10 which is a central component of the apparatus will now first be described together with its ancillary equipment.

In the form shown in FIG. 1 tank 10 is pear-shaped, which is advantageous in view of the pressure load and the mode of operation of the apparatus, and this design therefore is to be preferred when the tank is a component part of a stationary plant on shore, where there is ample space.

At the top the tank has an inlet for powder suspension and an outlet for air. The outlet is the filter unit 20 which consists of a container directly connected to the tank and containing several hose filters. The inlet is part of the conduit 17 which is passed through the lower portion of the filter unit and terminates in a diffusor 22 inside the tank. The diffusor 22 is a very important part of the apparatus, by highly reducing the flow velocity of the suspension the diffusor provides a highly efficient separation inasmuch as almost all the suspended material falls out of the air stream and into the tank at the low flow velocity produced by the diffusor, while the air escapes through the filter unit 20 which catches what may be left of the material in the air. At the top the tank further has a level indicator 23 of any known construction which delivers a signal when the tank has been filled with material up to the vicinity of the diffusor mouth.

Figure 2:
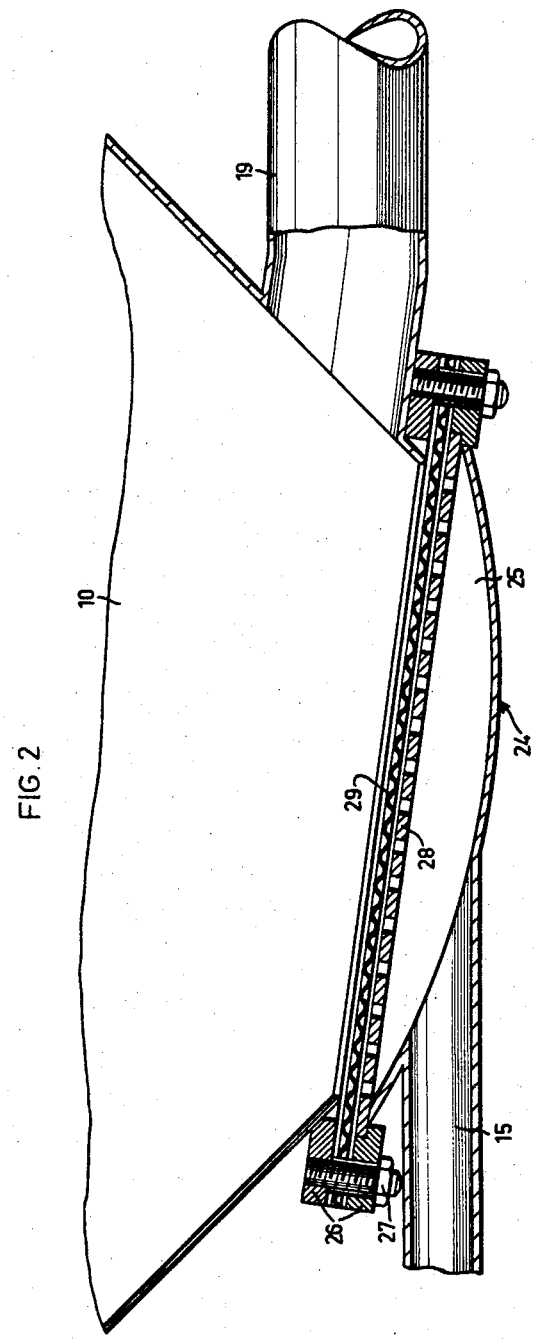
FIG. 2 is a vertical sectional view on a larger scale of an aerator forming the bottom portion of the separator tank.

In the lower portion the tank has an aerator 24 which is shown separately in FIG. 2. This aerator comprises a body 25 which is held to the tank by means of flanges 26 and screws 27 and forms an outer cup-shaped bottom for the tank and which is covered by an inner porous bottom consisting of a perforated metal sheet 28 covered by a filter cloth or felt 29. The pressure conduit 15 is connected to the aerator 24 to pass compressed air into it, said compressed air penetrating upwards through the inner bottom 28, 29, suspending in itself material in the tank. The inner bottom 28, 29 inclines toward one side, and opening just above it on this side is the pressure conduit 19 through which the suspension in the tank is blown out when the tank is placed under pressures above atmospheric.

Pressure conduit 16 is drawn into tank 10 above the inner bottom 28, 29 and branches into several perforated pipes 30 for distributing compressed air in the lower portion of the tank and increasing the pressure in the tank so that the suspension produced in the tank is blown out through conduit 19.

FIG. 3 shows aerator 13 which is shown in FIG. 1 placed on the bottom of a cargo compartment of a ship 31. The aerator is a box which has a bottom 32 and walls 33 and which is covered by panels 34 which incline downward toward the center of the box and are porous, consisting of a perforated metal sheet 35 and a filter cloth or felt 36 thereon. Pressure conduit 14 is drawn into the box to deliver air which penetrates in an upward direction through the panels 34 and suspends the material on said panels so that it is able to flow toward the center of the box and be sucked up through the suction conduit 17 which has its open inlet end a short distance above that point. To facilitate the sucking-up procedure a pipe 37 leads from the atmosphere into the box and terminates in a vertical portion 38 which extends upward in the suction conduit 17 to deliver air thereinto by ejector action for dilution of the sucked-up suspension so that the latter shall not become too compact and choke in the suction conduit. On the sides the aerator is supplemented by sloping air slides 39 built like the aerator panels and supplied with air through openings in the side walls 33 of the aerator.

As will appear from FIG. 1 the three pressure conduits 14, 15, 16 are fed by air pump 11 through a common pump discharge conduit 40 which is equipped with a safety valve SV1 and an automatically and manually operated three-way bleed valve BV for bleeding air through a conduit 41 which is provided with a non-return valve NRV1. Pressure conduit 14 which extends from conduit 40 directly downstream of bleed valve BV, is provided with a control valve CV1 and a pressure gauge M. Downstream of the starting point of conduit 14 discharge conduit 40 has a non-return valve NRV2 and a control valve CV2, and, downstream of the latter, conduit 40 branches into conduits 15 and 16 which are equipped each with one control valve CV3 and CV4, respectively.

Suction conduit 17 has two control valves CV5 and CV6, respectively, and between them an inlet for air from the atmosphere through a valve CV7 for diluting the suspension in suction conduit 17, in case of need.

Suction conduit 18 has a control valve CV8 upstream of filter unit 21, and a safety valve SV2 and a pressostat PS1 between filter unit 21 and air pump 12. Air pump 12 has an outlet conduit 42 equipped with a safety valve SV3, a pressostat PS2, a temperature responsive signalling means TS, a non-return valve NRV3, a control valve CV9, and a silencer 43. Pressostats PS1 and PS2 sense the pressure level and the pressure increase across pump 12, and together with filter unit 21 they constitute a guard arrangement for air pump 12, should a filter in filter unit 20 break. Filter unit 21 shall be so designed that its filter is easily clogged by material in the passing air, and should this occur the pressure is reduced on the suction side of air pump 12 and the pressure across the pump is increased, pressostats PS1 and PS2 becoming operative and opening—over a servo arrangement indicated by dash lines 44—bleed valve BV so that the air delivered by air pump 11 can escape through conduit 41, a control valve CV10 and a silencer 45, the aerator 13 ceasing to function and no more material being sucked up through suction conduit 17. Preferably, filter unit 21 should also be so constructed that its filter can be conveniently inspected at frequent intervals so that unsatisfactory separation in tank 10 and filter unit 20 is discovered before pump 12 has been seriously damaged.

Pressure conduit 19 which leads suspension out of tank 10 is provided with a control valve CV11. This pressure conduit can be supplied with additional compressed air from both air pumps 11 and 12 to accelerate blowing out of the suspension. For such additional supply a branch conduit 46 including a control valve CV12 is run from conduit 41 upstream of control valve CV10 thereof to conduit 19. A branch conduit 47 including a control valve CV13 is run from conduit 42 upstream of control valve CV9 thereof to conduit 19, and further a conduit 48 including a control valve 14 is run from conduit 42 between control valve CV9 thereof and silencer 43 to conduit 18 between control valve CV8 and filter unit 21. This device is used only during the second operating period of the apparatus when the suction system is not operative, and with valves CV8 and CV9 closed and valve CV13 open pump 12 can suck air through silencer 43, conduit 48 and the downstream portion of conduit 18 and force the air to conduit 19 through conduits 42 and 47.

The function of the apparatus described in the foregoing will largely appear from the above statements. During the first operating period both pumps 11 and 12 are operative, valves CV1, CV5, CV6, CV8 and CV9 are open and valves CV2 and CV11 are closed. Pump 11 delivers compressed air to aerator 13 and air slides 39 only, and pump 12 sucks material suspended in air through conduit 17 to tank 10 where it falls out of the air stream and is collected in the tank while the air is sucked out through filter unit 20 and conduit 18 including filter unit 21 and finally escapes through silencer 43. This continues until level indicator 23 shows that the tank is almost filled with material when the operation is shifted so that sucking ceases and the second operating period, emptying of tank 10, is started. During this second operating period valves CV1, CV6 and CV8 are closed while valves CV2, CV3, CV4 and CV11 are open so that pump 11 is able to build up a pressure in tank 10 and expel the suspension produced therein through conduit 19 for example to a silo. With a very long conduit 19 and/or when said conduit 19 is run to a relatively high level propelling additional air can be supplied to conduit 19 in the manner already described on one hand from pump 11 through conduits 41 and 46, and on the other hand from pump 12 through conduits 48, 18, 42 and 47. It will be realized that by adjusting a number of control means and without any structural changes the apparatus can be adapted to various operating conditions so that it always works with the highest efficiency.

In practice the apparatus described actually consists of two parts inasmuch as aerator 13, air slides 39 and parts of conduits 14 and 17 are comprised in the equipment of a ship while the remaining apparatus is a stationary system on a quay 49 or the like to which the ship-carried part is connected by two pipe couplings 50 and 51. Of course, the parts of conduits 14, 17 comprised in the stationary system should be movable; they preferably consist wholly or partly of hoses. Alternatively, however, the entire apparatus can be installed in a ship which can then be unloaded almost anywhere, which of course is to be preferred when material, for example cement, is to be delivered occasionally to a receiver.

FIG. 4 shows a modification of the apparatus described above, in which the separator tank is doubled. There are thus shown two separator tanks 10A and 10B equipped with filter units 20A, 20B, level indicators 23A and 23B and aerators 24A, 24B.

Air pumps 11 and 12 are disposed in the same manner as in FIG. 1, pump 11 having a pressure conduit 40 including safety valve SV1, bleed valve BV, non-return valve NRV2 and control valve CV2, and pump 12 having a suction conduit 18 including filter 21, safety valve SV2 and pressostat PS1, and a discharge conduit 42 including safety valve SV2, pressostat PS2, temperature responsive signalling means TS, non-return valve NRV3, control valve CV9 and silencer 43. Bleed valve BV like before is controlled by pressostats PS1 and PS2 through a servo arrangement 44. Also delivery pressure conduit 19, bleed conduit 41 with non-return valve NRV1, control valves CV10, CV12 and silencer 45, conduit 47 with control valve CV13, and conduit 48 with control valve CV14 are arranged as in FIG. 1.

Tanks 10A and 10B are connected to the pressure conduit 40 of pump 11 over separate pressure conduits 15A, 16A and 15B, 16B equipped with control valves CV3A, CV4A, CV3B, CV4B, to the suction conduit of pump 12 by separate suction conduits 18A and 18B equipped with control valves CV8A and CV8B, and to delivery conduit 19 through separate pressure conduits 19A and 19B having control valves CV11A and CV11B. Thus the two separator tanks 10A and 10B are separately connected to the pumps in the same way as tank 10 in FIG. 1.

Each tank 10A, 10B has a separate suction line 17A, 17B with control valves CV5A, CV6A, CV5B, CV6B and a dilution air valve CV7A, CV7B, said separate suction line opening into the tank through a diffuser 22A, 22B.

FIG. 4 shows the compartment of the ship 131 to be unloaded equipped with six aerators 13 according to FIG. 3, supplemented with air slides 39 and having compressed air conduits 14A, 14B, atmospheric air supply conduits 37 and suction conduits 117A, 117B. Suction conduits 117A, 117B are equipped with control valves CV15A, CV15B, and three of them 117A are connected with suction conduit 17A by means of a coupling 51A while the other three 117B are connected to suction conduit 17B by means of a coupling 51B.

As shown in FIG. 4 and also in FIG. 5 the compressed air conduits 14A and 14B of all aerators 13 are equipped with control valves CV16A, CV16B and connected to a manifold 114 which is connected by a coupling 50 to pressure conduit 14 which is in FIG. 1 extends from pressure conduit 40 of pump 11 and is equipped with control valve CV1 and pressure gauge M.

In the apparatus shown in FIG. 4 each separator tank 10A and 10B can obviously be operated exactly as separator tank 10 in FIG. 1. The intention of this doubling is that the two separators are to operate alternately. Thus one of them, e.g. 10A, starts with the first operating period, i.e. sucking-in of a batch of material through suction conduit 17A, while the other tank 10B is shut off. When tank 10A is filled the valves are adjusted as required so that tank 10A in its second operating period is emptied through delivery conduit 19 simultaneously as tank 10B is filled through its suction conduit 17B. Then a new adjustment takes place so that tank 14A is again filled while tank 10B is emptied, and unloading continues in this manner until the entire load has been unloaded. When the compartment begins to get empty so that some of suction conduits 117A or 117B sucks air only, valve CV15A or CV15B in said conduit is shut off, and in the same way valve CV16A or CV16B in compressed air conduit 14A or 14B to the corresponding aerator 13 also is closed.

In this way the unloading work may continue while fully exploiting the capacity of pumps 11 and 12 (their capacity need not be much greater than that required for a single tank 10), and this will shorten the total unloading time to hardly more than half as compared to that of the apparatus shown in FIG. 1. The modification according to FIGS. 4 and 5 will therefore be the preferred embodiment in most cases.

The apparatus according to FIGS. 4 and 5 is largely shown mounted on a quay 49 as is the apparatus in FIG. 1, but alternatively it may of course—like the latter—be installed entirely in a ship from which pulverulent bulk cargo can be unloaded rapidly and efficiently in any part whatever since no special equipment is required on shore.

What I claim and desire to secure by Letters Patent is:

1. An apparatus for delivering pulverulent material from transportation means having an open cargo compartment, comprising in combination a separator tank; a suction system including a first pump, a first suction conduit connecting said tank with said first pump for drawing air from said tank, a second suction conduit connecting a bottom portion of said compartment with said tank for drawing aerated material from said compartment into said tank, separator means associated with said tank for separating the material and air drawn into said tank and collecting the material in said tank, and control valves in said suction conduits; and a pressure system including a second pump, a first aerator positioned on the bottom of said compartment below the inlet end of said second suction conduit for aerating material therearound, a first pressure conduit connecting said second pump with said first aerator for supplying said aerator with air under pressure, a second aerator positioned in the bottom portion of said tank for aerating material collected therein, a second pressure conduit connecting said second pump with said second aerator for supplying said second aerator with air under pressure, a third pressure conduit connecting said second pump with said tank for supplying said tank with air under pressure, a pressure discharge conduit connected to said tank for discharging aerated material from said tank, and control valves in said pressure and discharge conduits.

2. An apparatus for delivering pulverulent material from transportation means having an open cargo compartment, comprising in combination a separator tank; a suction system including a first pump, a first suction conduit connecting said tank with said first pump for drawing air from said tank, a second suction conduit connecting a bottom portion of said compartment with said tank for drawing aerated material from said compartment into said tank, separator means associated with said tank for separating the material and air drawn into said tank and storing the material in said tank, a third suction conduit connected to the suction side of said first pump for supplying said first pump with air from the atmosphere, and control valves in said suction conduits; and a pressure system including a second pump, a first aerator positioned on the bottom of said compartment below the inlet end of said second suction conduit to aerate material therearound, a first pressure conduit connecting said second pump with said first aerator to supply said aerator with air under pressure, a second aerator positioned in the bottom portion of said tank for aerating material collected therein, a second pressure conduit connecting said second pump with said second aerator for supplying said second aerator with air under pressure, a third pressure conduit connecting said second pump with said tank for supplying said tank with air under pressure, a discharge conduit connected to said tank for discharging aerated material from said tank, an auxiliary pressure conduit connecting the pressure side of said first pump with said discharge conduit for supplying said discharge conduit with auxiliary air under pressure, and control valves in said pressure and discharge conduits.

3. An apparatus for delivering pulverulent material from transportation means having an open cargo compartment, comprising in combination a separator tank; a suction system including a first pump, a first suction conduit connecting said tank with said first pump for drawing air from said tank, a second suction conduit connecting a bottom portion of said compartment with said tank for drawing aerated material from said compartment into said tank, separator means associated with said tank for separating the material and air drawn into said tank and collecting the material in said tank, and control valves in said suction conduits; and a pressure system including a second pump, a first aerator positioned on the bottom of said compartment below the inlet end of said second suction conduit for aerating material therearound, a first pressure conduit connecting said second pump with said first aerator for supplying said aerator with air under pressure, a second aerator positioned in the bottom portion of said tank for aerating material collected therein, a second pressure conduit connecting said second pump with said second aerator for supplying said second aerator with air under pressure, a third pressure conduit connecting said second pump with said tank for supplying said tank with air under pressure, a pressure discharge conduit connected to said tank for discharging aerated material from said tank, an auxiliary pressure conduit connecting the pressure side of said second pump with said discharge conduit for supplying said discharge conduit with auxiliary air under pressure, and control valves in said pressure and discharge conduits.

4. An apparatus for delivering pulverulent material from an open compartment, comprising in combination a separator tank; a suction system including a first pump, a first suction conduit connecting said tank with said first pump for drawing air from said tank, a second suction conduit connecting a bottom portion of said compartment with said tank for drawing aerated material from said compartment into said tank, separator means associated with said tank for separating the material and air drawn into said tank and collecting the material in said tank, and control valves in said suction conduits; and a pressure system including a second pump, a first aerator positioned on the bottom of said compartment below the inlet end of said second suction conduit for aerating material therearound, a first pressure conduit connecting said second pump with said first aerator for supplying said aerator with air under pressure, a second aerator positioned in the bottom portion of said tank for aerating material collected therein, a second pressure conduit connecting said second pump with said second aerator for supplying said second aerator with air under pressure, a third pressure conduit connecting said second pump with said tank for supplying said tank with air under pressure, a pressure discharge conduit connected to said tank for discharging aerated material from said tank, and control valves in said pressure and discharge conduits, a bleed valve connected with the pressure side of said second pump and operable for bleeding off pressure therefrom to the atmosphere, two pressostats connected to the suction side and the pressure side, respectively, of said first pump, and a servo arrangement actuated by said pressostats for operating said bleed valve in response to the pressure rise across said first pump.

References Cited

UNITED STATES PATENTS

| 1,935,843 | 11/1933 | Goebels | 302—53 |
| 2,758,564 | 8/1956 | Randall | 302—29 |
| 2,924,489 | 2/1960 | Beckmann | 302—53 |

FOREIGN PATENTS

| 212,893 | 2/1958 | Australia. |

ANDRES H. NIELSEN, *Primary Examiner.*

ERNEST A. FALLER, SAMUEL F. COLEMAN,
*Examiners.*